(12) United States Patent
Yabuta et al.

(10) Patent No.: US 11,641,146 B2
(45) Date of Patent: May 2, 2023

(54) WHEEL BEARING SYSTEM WITH GENERATOR

(71) Applicant: NTN CORPORATION, Osaka (JP)

(72) Inventors: Hiroki Yabuta, Iwata (JP); Mitsuo Kawamura, Iwata (JP); Kentaro Nishikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/705,994

(22) Filed: Dec. 6, 2019

(65) Prior Publication Data

US 2020/0112229 A1 Apr. 9, 2020

Related U.S. Application Data

(63) Continuation of application No. PCT/JP2018/021413, filed on Jun. 4, 2018.

(30) Foreign Application Priority Data

Jun. 8, 2017 (JP) .............................. JP2017-113246

(51) Int. Cl.
*H02K 7/18* (2006.01)
*B60B 27/00* (2006.01)
(Continued)

(52) U.S. Cl.
CPC ....... *H02K 7/1861* (2013.01); *B60B 27/0005* (2013.01); *B60B 27/0094* (2013.01);
(Continued)

(58) Field of Classification Search
CPC ............ B60B 27/0094; B60B 27/0005; B60K 7/0007; F16C 19/00; F16C 19/06;
(Continued)

(56) References Cited

U.S. PATENT DOCUMENTS 5,087,229 A * 2/1992 Hewko ................ B60K 7/0007
475/149
6,142,673 A 11/2000 Kottritsch et al.
(Continued)

FOREIGN PATENT DOCUMENTS

CN 1378622 A 11/2002
CN 101113764 A 1/2008
(Continued)

OTHER PUBLICATIONS

International Search Report dated Aug. 28, 2018, in corresponding International Patent Application No. PCT/JP2018/021413.
(Continued)

*Primary Examiner* — Tran N Nguyen

(57) ABSTRACT

Provided is a wheel bearing apparatus with a generator that can have a simplified structure to reduce costs and is capable of preventing electrolytic corrosion. The wheel bearing apparatus with a generator includes a wheel bearing and a generator. The generator includes a stator attached to a fixed wheel and a motor rotor attached to a rotating wheel and is of an outer-rotor type in which the stator is located on an outer periphery of the wheel bearing, and the motor rotor is located radially outside of the stator. The wheel bearing apparatus with the generator further includes at least one conducting unit that conducts a current between the fixed wheel and the rotating wheel.

1 Claim, 10 Drawing Sheets

(51) Int. Cl.
  *F16C 41/00*   (2006.01)
  *H02K 1/2786*  (2022.01)

(52) U.S. Cl.
  CPC ......... *F16C 41/004* (2013.01); *H02K 1/2786* (2013.01); *F16C 2300/42* (2013.01)

(58) Field of Classification Search
  CPC ........ F16C 19/18; F16C 19/184; F16C 19/52; F16C 33/00; F16C 33/58; F16C 33/66; F16C 33/78; F16C 33/7876; F16C 33/7879; F16C 41/004; F16C 41/002; H02K 7/18; H02K 7/1861; H02K 5/173
  See application file for complete search history.

(56) References Cited

U.S. PATENT DOCUMENTS

| | | | |
|---|---|---|---|
| 6,755,572 B1 * | 6/2004 | Kinbara | F16C 41/002 384/462 |
| 6,929,331 B2 | 8/2005 | Ohtsuki | |
| 9,453,536 B2 | 9/2016 | Vogler et al. | |
| 2004/0046441 A1 | 3/2004 | Ohtsuki | |
| 2004/0170346 A1 | 9/2004 | Komeda et al. | |
| 2005/0236887 A1 | 10/2005 | Ohtsuki | |
| 2009/0245935 A1 * | 10/2009 | Kamikawa | B60B 27/0094 403/359.1 |
| 2013/0075176 A1 * | 3/2013 | Chan | B62M 6/55 475/5 |
| 2015/0008721 A1 | 1/2015 | Vogler et al. | |
| 2017/0108047 A1 * | 4/2017 | White | F16C 33/82 |

FOREIGN PATENT DOCUMENTS

| | | | |
|---|---|---|---|
| CN | 104245382 A | 12/2014 | |
| DE | 299 16 854 U1 | 1/2000 | |
| DE | 10 2012 204 795 A1 | 9/2013 | |
| EP | 0 962 675 A2 | 12/1999 | |
| JP | 3-57721 | 3/1991 | |
| JP | 9-291943 | 11/1997 | |
| JP | 10-322960 | 12/1998 | |
| JP | 11351265 * | 12/1999 | ............. F16C 33/78 |
| JP | 2001-145293 | 5/2001 | |
| JP | 2001140911 * | 5/2001 | ............. F16C 41/00 |
| JP | 2004-100887 | 4/2004 | |
| JP | 2006-234093 A | 9/2006 | |
| JP | 2006-328273 A | 12/2006 | |
| JP | 2007-161760 A | 6/2007 | |
| JP | 2008-271644 | 11/2008 | |
| JP | 2009-197114 A | 9/2009 | |
| JP | 2013-169904 | 9/2013 | |
| JP | 5402619 | 1/2014 | |
| JP | 2015-20707 | 2/2015 | |
| JP | 2015-102200 | 6/2015 | |
| JP | 2016-25789 | 2/2016 | |

OTHER PUBLICATIONS

English Translation by WIPO of the International Preliminary Report on Patentability dated Dec. 19, 2019 in corresponding International Patent Application No. PCT/JP2018/021413.
Extended European Search Report dated Jan. 28, 2021, in corresponding European Patent Application No. 18813437.3.
Notice of Reasons for Refusal dated Jul. 13, 2021, in Japanese Application No. 2017-113246 (10 pages including translation).
Notice of Reasons for Refusal dated Feb. 8, 2022 in Japanese Patent Application No. 2017-113246.
Japanese Office Action dated Aug. 23, 2022 in Japanese Patent Application No. 2017-113246 (6 pages; 6 pages English translation).
Chinese Office Action dated May 6, 2022 in Chinese Patent Application No. 201880037405.9 (8 pages; 9 pages English translation).
Office Action dated Feb. 21, 2023 in Japanese Patent Application No. 2017-113246 (4 pages; 4 pages English translation).

* cited by examiner

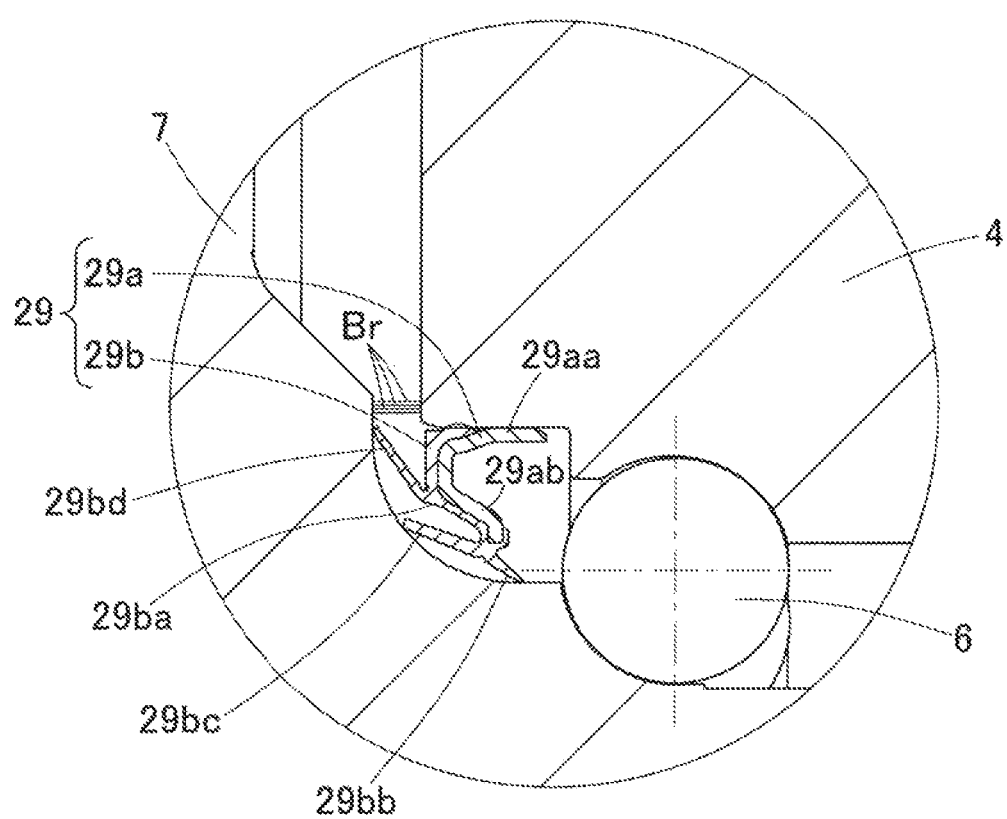

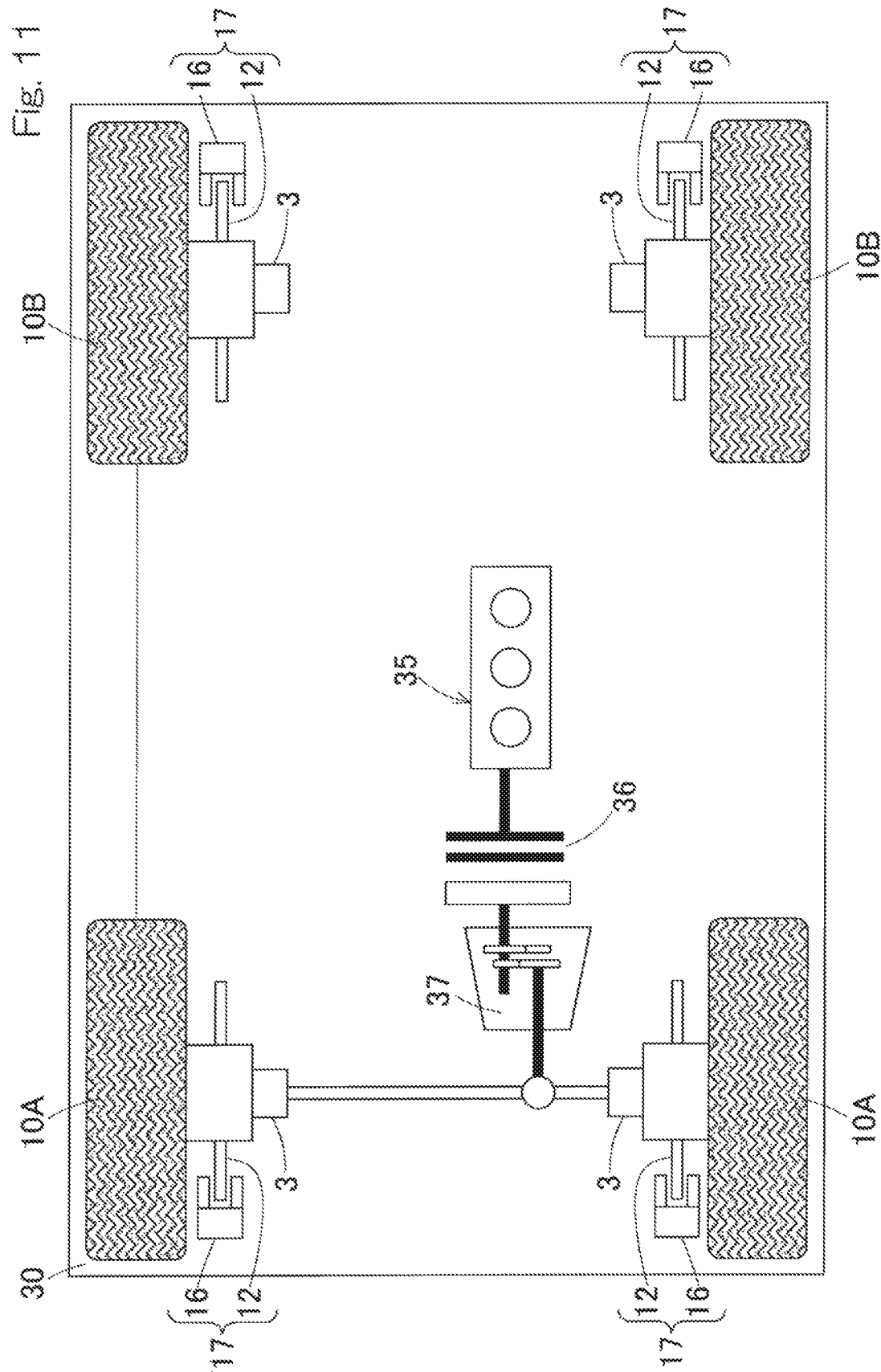

WHEEL BEARING SYSTEM WITH GENERATOR

CROSS REFERENCE TO THE RELATED APPLICATION

This application is a continuation application, under 35 U.S.C. § 111(a), of international application No. PCT/JP2018/021413, filed Jun. 4, 2018, which claims Convention priority to Japanese patent application No. 2017-113246, filed Jun. 8, 2017, the entire disclosures of all of which are herein incorporated by reference as a part of this application.

BACKGROUND OF THE INVENTION

Field of the Invention

The present invention relates to a wheel bearing system or apparatus with a generator and to a technology of simplifying a structure to reduce costs and preventing electrolytic corrosion.

Description of Related Art

A wheel driving device having a motor of an inner-rotor type as a driving source has been proposed (Patent Document 1). In such a wheel driving device, a contacting body having a conical surface or a spherical surface and electrically connected with a stator is pressed against a rotor so as to achieve electrical conduction between the rotor and the stator, preventing electrolytic corrosion in a rolling bearing part of a wheel bearing.

A conventional in-wheel motor system is considered to be designed to use an in-wheel motor as a main driving source for travelling. With respect to this, although not with an in-wheel motor, it has been proposed to use a motor as an auxiliary driving source for travelling of an engine automobile.

As an auxiliary power system, it has been proposed to configure a motor generator mounted in a vehicle to be able to transmit power only between the generator and rear wheels that are not driven by a main power system, and to configure a power source device to supply electrical driving power only to the motor generator and store only regenerative electrical power from the motor generator (for example, Patent Document 2).

RELATED DOCUMENT

Patent Document

[Patent Document 1] JP Patent No. 5402619
[Patent Document 2] JP Laid-open Patent Publication No. 2016-25789

Patent Document 1 prevents electrolytic corrosion only in a wheel driving device that uses a motor of an inner-rotor type as a driving source. The motor of the inner-rotor type is less efficient than a motor of an outer-rotor type because a moment is generated at a position on an inner-diameter side. In addition, since the wheel driving device of Patent Document 1 requires a speed reducer or reduction gear and the like, the device includes a greater number of components, resulting in higher manufacturing costs.

In a configuration of Patent Document 2, a battery and a motor generator are connected, and the motor generator serves as a mechanism that transmits power to a driven wheel (tire) via a clutch, a power distribution mechanism and a drive shaft. Accordingly, installation of an auxiliary power system results in a configuration of components equivalent to that of a four-wheel drive vehicle, which makes the structure complicated and causes an increase in a vehicle weight.

In a wheel bearing apparatus having a motor generator, a voltage is generated in a stator in respective cases where the motor generator operates as a driving motor when the vehicle is travelling and where the motor generator operates as a regenerative brake when the vehicle is braked. Where a potential difference occurs between an inner ring and an outer ring of a bearing due to, e.g., a short circuit caused by peeling off of wiring covering, to cause a current to flow through a rolling element, a spark occurs between the rolling element and a raceway surface. The spark causes the rolling element and the raceway surface to melt, resulting in a pearskin-like or corrugated electrolytic corrosion. Occurrence of such electrolytic corrosion may generate abnormal noise from the bearing or lead to shortened life of the bearing.

SUMMARY OF THE INVENTION

An object of the present invention is to provide a wheel bearing apparatus with a generator that can have a simplified structure to reduce costs and is capable of preventing electrolytic corrosion.

A wheel bearing apparatus with a generator according to the present invention includes: a wheel bearing including a fixed wheel and a rotating wheel having a hub flange, the rotating wheel being rotatably supported by the fixed wheel via rolling elements and attached with a vehicle wheel and a brake rotor at the hub flange;

a generator including a stator attached to the fixed wheel and a motor rotor (or a rotor of the generator) attached to the rotating wheel, the generator being of an outer-rotor type in which the stator is located on an outer periphery of the wheel bearing, and the motor rotor (or the rotor of the generator) is located radially outside of the stator; and at least one conducting unit configured to conduct a current between the fixed wheel and the rotating wheel.

According to this configuration, since the motor rotor is of a direct drive type which is attached to the rotating wheel of the wheel bearing, the generator can have a simple and compact configuration, making it possible to suppress an increase in a vehicle weight. Thanks to the simple configuration of the generator, the costs can be reduced. Thanks to a suppressed increase in the vehicle weight, fuel consumption can be reduced. Since the generator is of an outer-rotor type in which the motor rotor is located radially outside of the stator, a moment is generated at a position on an outer-diameter side, resulting in better power generation efficiency than that of a generator of an inner-rotor type. In particular, since the wheel bearing apparatus includes the conducting unit that conducts a current between the fixed wheel and the rotating wheel, the wheel bearing apparatus can eliminate a potential difference between the motor rotor and the stator to prevent a current from flowing between the rotating wheel and the fixed wheel through the rolling elements. This makes it possible to prevent abnormality in the bearing function due to electrolytic corrosion. Prevention of electrolytic corrosion makes it possible to avoid abnormality in the rolling elements and raceway surfaces, which can contribute to life elongation of the bearing.

The wheel bearing apparatus with a motor generator of the present invention includes: a wheel bearing having a fixed wheel and a rotating wheel having a hub flange, the rotating wheel being rotatably supported by the fixed wheel via rolling elements and attached with a vehicle wheel and a brake rotor at the hub flange;

a motor generator including a stator attached to the fixed wheel and a motor rotor attached to the rotating wheel, the motor generator being of an outer-rotor type in which the stator is located on an outer periphery of the wheel bearing, and the motor rotor is located radially outside of the stator; and at least one conducting unit configured to conduct a current between the fixed wheel and the rotating wheel.

A first conducting unit of the at least one conducting unit is a conductive (electroconductive) ring fixed to a peripheral surface of a raceway ring of one of the fixed wheel and the rotating wheel, and a part of the conductive ring may abut with a raceway ring of the other of the fixed wheel and the rotating wheel. In such a case, the conductive ring can be easily provided using a peripheral surface of a raceway ring of an existing wheel bearing.

A second conducting unit of the at least one conducting unit may be an outer-side sealing member that is made of a conductive material and seals an outboard-side end between the fixed wheel and the rotating wheel. In such a case, the outer-side sealing member has both functions of sealing the outboard-side end and serving as a conducting unit, making it possible to reduce the number of components and to reduce costs with a simplified structure.

A third conducting unit of the at least one conducting unit may be an inner-side sealing member that is made of a conductive material and seals an inboard-side end between the fixed wheel and the rotating wheel. In such a case, the inner-side sealing member has both functions of sealing the inboard-side end and serving as a conducting unit, making it possible to reduce the number of components and to reduce costs with a simplified structure.

A fourth conducting unit of the at least one conducting unit may be a conductive covering member that covers the inboard-side end of the fixed wheel, and the covering member may be in contact with the rotating wheel at a center of a rotation axis. In such a case, the covering member can be brought into contact with the rotating wheel without being influenced by a peripheral speed of the wheel bearing. This makes it possible to reduce torque in the wheel bearing and to improve fuel consumption or electric power consumption rate of the vehicle.

A fifth conducting unit of the at least one conducting unit may be an electroconductive grease filled in the wheel bearing. In such a case, the effect of preventing electrolytic corrosion can be obtained without providing an additional component.

A wheel bearing apparatus with a generator according to another aspect of the present invention includes: a wheel bearing including a fixed wheel and a rotating wheel having a hub flange, the rotating wheel being rotatably supported by the fixed wheel via rolling elements and attached with a vehicle wheel and a brake rotor at the hub flange;

a generator including a stator attached to the fixed wheel and a motor rotor (or a rotor of the generator) attached to the rotating wheel, the generator being of an outer-rotor type in which the stator is located on an outer periphery of the wheel bearing, and the motor rotor (or the rotor of the generator) is located radially outside of the stator; and at least one conductor provided between the fixed wheel and the rotating wheel and configured to conduct a current between the fixed wheel and the rotating wheel.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views. In the figures.

FIG. 6 is an enlarged sectional view of a conducting unit of a wheel bearing apparatus with a generator according to a fifth embodiment of the present invention;

FIG. 11 illustrates a concept of a different vehicle system from the vehicle system shown in FIG. 9.

DESCRIPTION OF THE EMBODIMENTS

Figure 1:
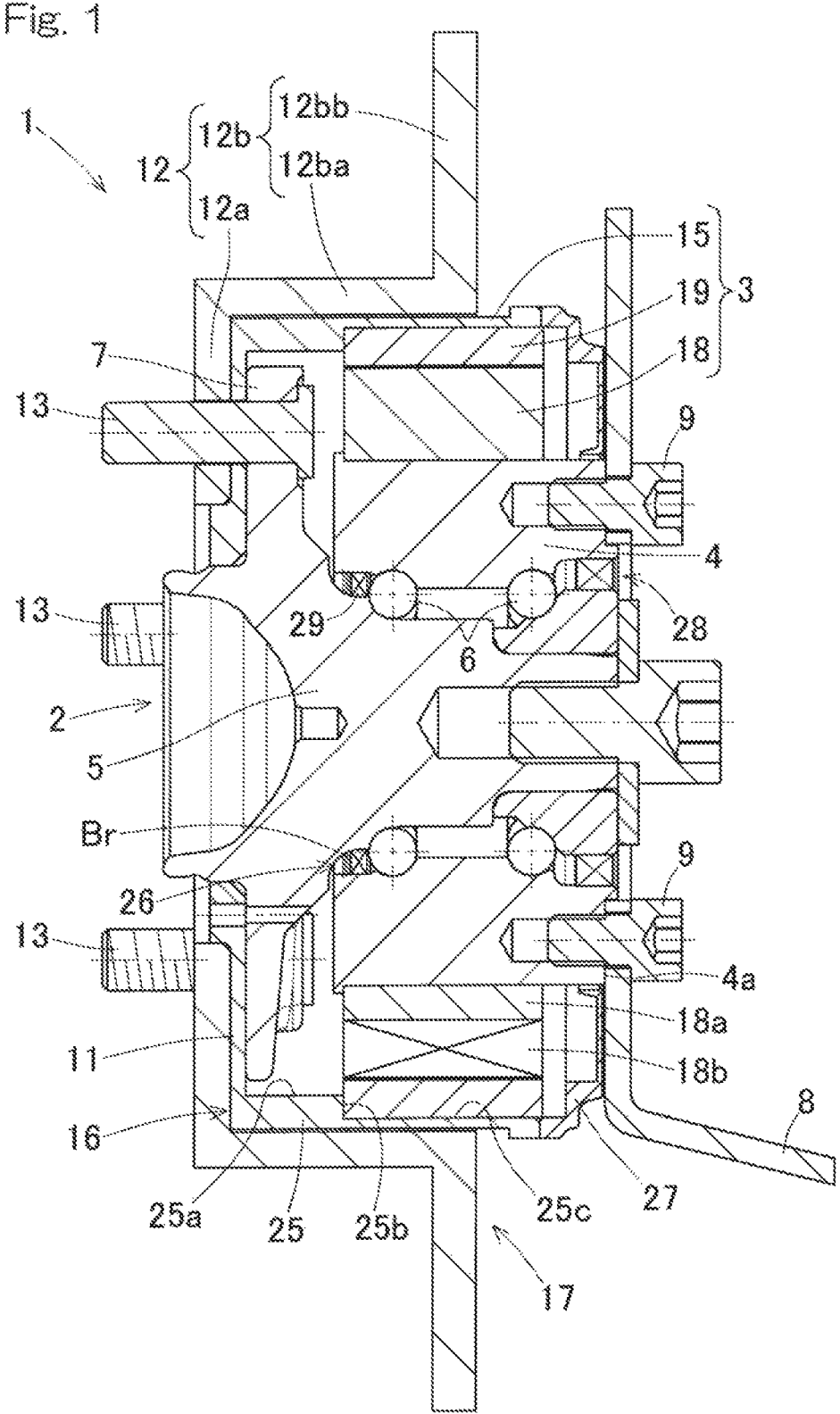
FIG. 1 is a sectional view of a wheel bearing apparatus with a generator according to a first embodiment of the present invention.

A wheel bearing apparatus with a generator according to a first embodiment of the present invention will be described with reference to FIG. 1 and FIG. 2. As shown in FIG. 1, the wheel bearing apparatus 1 with a generator includes a wheel bearing 2 and a generator 3.

<Wheel Bearing 2>

The wheel bearing 2 includes an outer ring 4 as a fixed wheel, double-row rolling elements 6, and an inner ring 5 as a rotating wheel. The inner ring 5 is rotatably supported by the outer ring 4 via the double-row rolling elements 6. A bearing space between the inner and outer rings 5, 4 is filled with grease. The inner ring 5 has a hub flange 7 at a part protruding toward an outboard side in an axial direction with respect to the outer ring 4. The outer ring 4 is attached to a chassis frame part 8 (such as a knuckle) by a bolt 9 on a vehicle body attachment surface 4a, which is an end portion (on the inboard side) opposite to the hub flange 7, so as to support a weight of the vehicle. It should be noted that, in this description, the term "outboard side" refers to a side toward an outside of a vehicle in a widthwise direction of the vehicle in a state where the wheel bearing apparatus 1 with a generator is mounted in a vehicle, and the term "inboard side" refers to a side toward a center of the vehicle in the widthwise direction of the vehicle.

On a side surface on the outboard side of the hub flange 7, a rim (not illustrated) of the wheel, a brake rotor 12 and a casing bottom part 11 (which will be described later) are attached by a hub bolt 13 so as to axially overlap with one another. A tire is attached to an outer periphery of the rim.

<Brake 17>

A brake 17 is a friction brake including a brake rotor 12 of a disk type and a brake caliper that is not illustrated. The brake rotor 12 includes a plate-like part 12a and an outer peripheral part 12b. The plate-like part 12a is an annular plate-like member that overlaps with the hub flange 7 via the casing bottom part 11. The outer peripheral part 12b extends from the plate-like part 12a toward an outer peripheral side of the outer ring 4. The outer peripheral part 12b includes a cylindrical part 12ba extending in a cylindrical manner from an outer peripheral edge portion of the plate-like part 12a toward an inboard side and a plate part 12bb extending in a plate-like manner from an inboard-side end of the cylindrical part 12ba toward an outer diameter side.

The brake caliper includes a friction pad (not illustrated) that clamps or presses the plate part 12bb of the brake rotor 12. The brake caliper is attached to the chassis frame part 8. The brake caliper may be of a hydraulic or mechanical type. Alternatively, the brake caliper may be of an electric motor type.

<Generator 3>

The generator 3 of this embodiment is a motor generator for travel assistance which can generate power by rotation of a wheel and can rotatably drive the wheel by electrical power. The generator 3 includes: a motor casing 15 attached to the hub flange 7 of the inner ring 5; a stator 18 attached to an outer peripheral surface of the outer ring 4; and a motor rotor 19 covered by the motor casing 15. The generator 3 is an outer rotor motor in which the motor rotor 19 is located radially outside of the stator 18. The generator 3 in the illustrated example is an IPM (Interior Permanent Magnet) synchronous motor (or also called as an IPMSM (Interior Permanent Magnet Synchronous Motor)) of an outer-rotor type, but it may be an SPM (Surface Permanent Magnet) synchronous motor (or also called as an SPMSM (Surface Permanent Magnet Synchronous Motor)) of an outer-rotor type. In such a synchronous motor, the stator 18 may have any winding form, such as a distributed coil or a concentrated coil.

The motor casing 15 includes a casing main body 16 having a bottomed cylindrical shape, and the casing main body 16 includes a casing bottom part 11 and a casing cylindrical part 25. The casing bottom part 11 and the casing cylindrical part 25 are integrally formed. The casing bottom part 11 is an annular plate-like member that is interposed between the plate-like part 12a of the brake rotor 12 and the hub flange 7. The casing cylindrical part 25 extends in a cylindrical manner from an outer peripheral edge portion of the casing bottom part 11 toward the inboard side.

The casing cylindrical part 25 has an open end on the inboard side, which is covered by a sealing member 27 for a generator as described later. The casing cylindrical part 25 has an inner peripheral surface formed with a small-diameter portion 25a on the outboard side, a stepped portion 25b, and a large-diameter portion 25c on the inboard side.

The stator 18 includes cores 18a and coils 18b wound around the respective teeth of the cores 18a. A flange part extending radially outward is provided on the outer peripheral surface of the outer ring 4 on the outboard side. Outboard-side ends of the cores 18a abut with the flange part so that the stator 18 is axially positioned with respect to the outer ring 4. The motor rotor 19 includes a magnetic body (not illustrated) and a permanent magnet (not illustrated) that is provided inside the magnetic body. The motor rotor 19 is provided on the large-diameter portion 25c within the inner peripheral surface of the casing cylindrical part 25 by bonding, gluing, or the like. An outboard-side end of the motor rotor 19 abuts the stepped portion 25b of the casing cylindrical part 25 so that the motor rotor 19 is axially positioned with respect to the motor casing 15.

The wheel bearing apparatus 1 with the generator includes: a sealing member 27 for a generator; an inner-side sealing member 28; and an outer-side sealing member 29. The sealing member 27 for a generator seals an inboard-side end between the open end of the motor casing 15 and an outer periphery of the wheel bearing 2. The sealing member 27 for a generator is in slide contact with the outer peripheral surface of the outer ring 4 in the radial direction. The inner-side sealing member 28 is a contact-type sealing member that seals an inboard-side end between the outer ring 4 and the inner ring 5. The inner-side sealing member 28 prevents the grease from flowing out from the inside of the bearing at an open end portion, on the inboard side, of an annular space between the inner and outer rings 5, 4 as well as prevents entry of water or the like from the outside.

Figure 2:
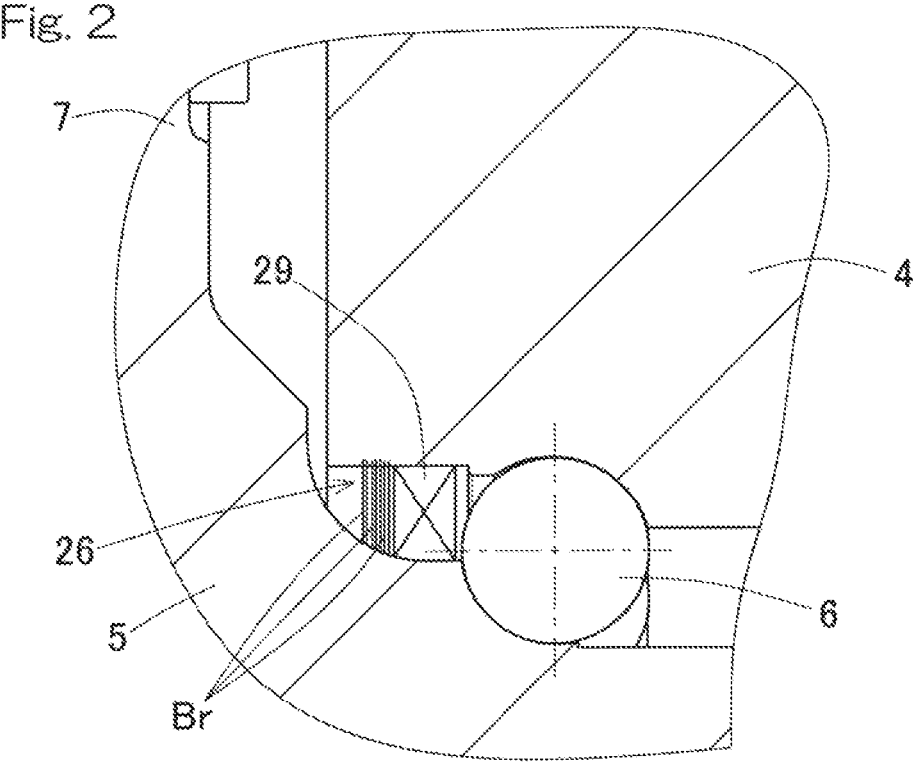
FIG. 2 is an enlarged sectional view of a conducting unit of the wheel bearing apparatus with the generator as shown in FIG. 1.

As shown in FIG. 2, the outer-side sealing member 29 is, for example, of a contact-type which seals an outboard-side end between the outer ring 4 and the inner ring 5. The outer-side sealing member 29 prevents the grease from flowing out from the inside of the bearing at an open end portion, on the outboard side, of the annular space between the inner and outer rings 5, 4 as well as prevents entry of water or the like from the outside.

<Conducting Unit 26>

The wheel bearing apparatus 1 with the generator includes a conducting unit 26 that enhances electrical conductive or conducting performance between the outer ring 4 and the inner ring 5. The conducting unit 26 in this embodiment is in the form of conducting brushes Br. There are a plurality of the conducting brushes Br across an entire circumference of the open end portion, on the outboard side, of the annular space between the inner and outer rings 5, 4. The conducting brushes Br are also provided at a position on the outboard side of the outer-side sealing member 29 and on an inner peripheral surface of a shoulder part of the outer ring 4. The conducting brushes Br, however, may be provided on the inboard side of the outer-side sealing member 29.

The conducting brushes Br extend radially inward from the inner peripheral surface of the outer ring 4 and have tip ends that abut the outer peripheral surface of the inner ring 5. The conducting brushes Br, however, may be provided so as to extend radially outward from the outer peripheral surface of the inner ring 5 in a radiating manner and have tip ends that abut the inner peripheral surface of the shoulder part of the outer ring 4.

The conducting brushes Br may be, for example, so-called carbon brushes made of carbon, or brushes made of a carbon-containing resin or rubber material, or conductive wires, such as copper wires. Where such a resin material or a rubber material is used, conducting performance can be continuously ensured without damaging the surface on the opposite side to be contacted.

With the wheel bearing apparatus 1 with the generator of according to the first embodiment as described above, since the motor rotor 19 of the generator 3 is a of a direct drive type which is attached to the inner ring 5, i.e., the rotating wheel, of the wheel bearing 2, the generator 3 can have a simple and compact configuration, making it possible to suppress an increase in a vehicle weight. Thanks to the simple configuration of the generator 3, the costs can be reduced. Thanks to a suppressed increase in the vehicle weight, fuel consumption can be reduced. Since the generator 3 is of an outer-rotor type in which the motor rotor 19 is located radially outside of the stator 18, a moment is generated at a position on an outer-diameter side, resulting in better power generation efficiency than that of a generator of an inner-rotor type.

In particular, since the generator 3 includes the conducting unit 26 in the form of the conducting brushes Br that enhance conducting performance between the outer ring 4 and the inner ring 5, the generator can eliminate a potential difference between the motor rotor 19 and the stator 18 to prevent a current from flowing between the inner ring 5 and the outer ring 4 via the rolling elements 6. This makes it possible to prevent abnormality in the bearing function due to electrolytic corrosion. Prevention of electrolytic corrosion makes it possible to avoid abnormality in the rolling elements 6 and raceway surfaces of the inner and outer rings 5, 4, which can contribute to life elongation of the bearing.

Other Embodiments

In the following description, features corresponding to those described in the above embodiment are denoted with like reference numerals, and overlapping description will not be repeated. Where description is made only to a part of a feature, other part of the feature is the same as that of the embodiment described above, unless specifically indicated otherwise. Like features provide like effects. Combination of parts is not limited to those specifically described in the respective embodiments, and parts of the embodiments can also be combined as long as such a combination does not particularly cause a problem.

Figure 3:
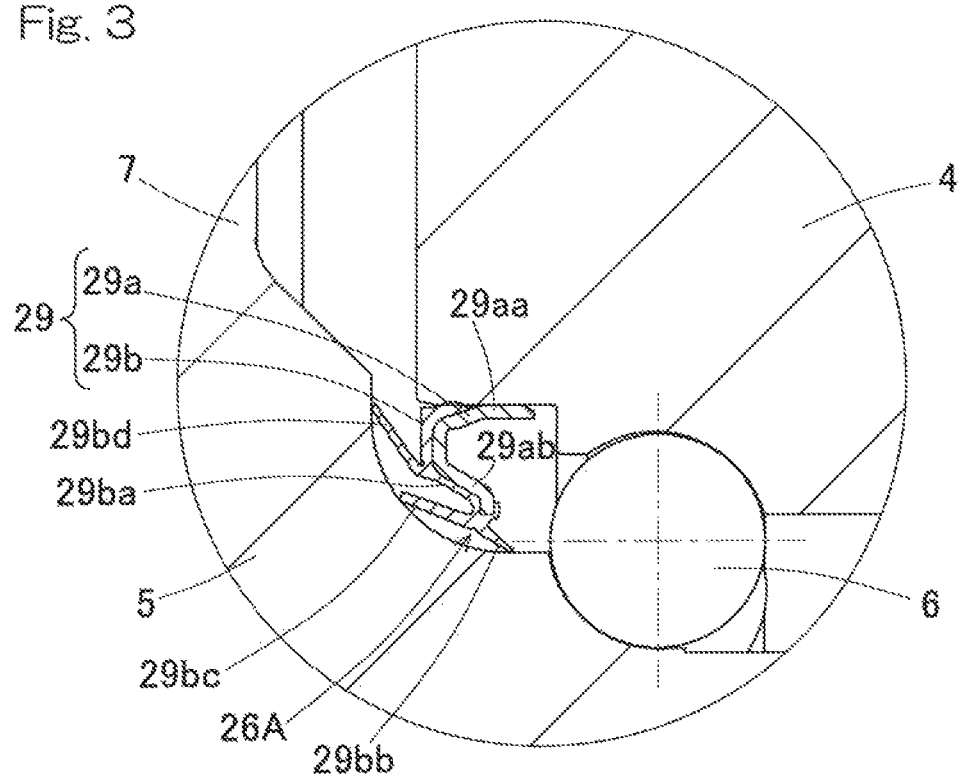
FIG. 3 is an enlarged sectional view of a conducting unit of a wheel bearing apparatus with a generator according to a second embodiment of the present invention.

As shown in FIG. 3, in a conducting unit 26A of a wheel bearing apparatus with a generator according to a second embodiment, the outer-side sealing member 29 may be made of a conductive material. That is, the outer-side sealing member 29 includes a conductive core metal 29a made of steel and a conductive elastic member 29b fixed to the core metal 29a. The core metal 29a includes a cylindrical portion 29aa and a radial wall portion 29ab extending radially inward from an outboard-side end portion of the cylindrical portion 29aa. The cylindrical portion 29aa is press-fitted with an interference fit to the inner peripheral surface of the shoulder part of the outer ring 4.

The elastic member 29b is made of, for example, a conductive rubber material. The conductive rubber material may preferably have a volume resistivity value of $30 \times 10^3 \Omega \cdot cm$ or lower. The elastic member 29b includes a sealing main body 29ba fixed to the core metal 29a and a plurality of lip portions 29bb, 29bc, 29bd extending from the sealing main body 29ba. The sealing main body 29ba and the plurality of (three, in the illustrated example) lip portions 29bb, 29bc, 29bd are integrally formed. The lip portion 29bb, which is located nearest to the inboard side, obliquely extends radially inwardly toward the inboard side and has a tip end that is in radial contact with the outer periphery of the inner ring 5, near the hub flange 7. The other two lip portions 29bc, 29bd obliquely extend radially outwardly toward the outboard side and have tip ends that are in axial contact near the hub flange 7, respectively.

According to this configuration, the outer-side sealing member 29 has both functions of sealing the open end portion, on the outboard side, of the annular space between the inner and outer rings 5, 4 and serving as the conducting unit 26A, making it possible to reduce the number of components and to reduce costs with a simplified structure, when compared to the above-described embodiment.

Figure 4:
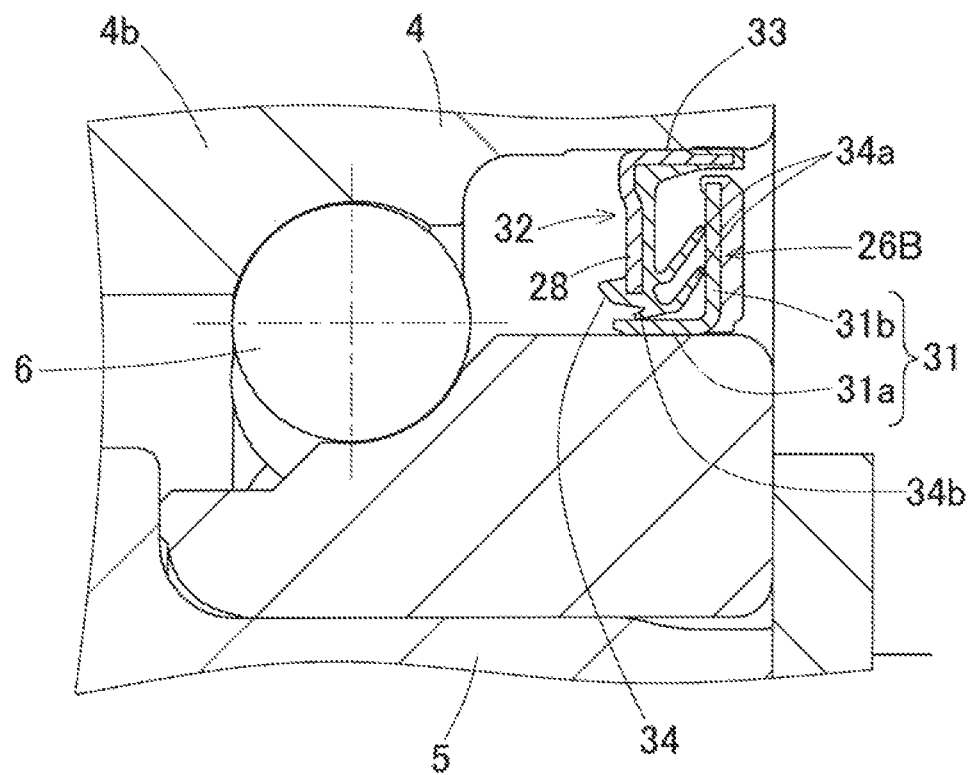
FIG. 4 is an enlarged sectional view of a conducting unit of a wheel bearing apparatus with a generator according to a third embodiment of the present invention.

As shown in FIG. 4, in a conducting unit 26B of a wheel bearing apparatus with a generator according to a third embodiment, the inner-side sealing member 28 may be made of a conductive material. In such a case, the outer-side sealing member 29 (FIG. 3) may be made of a conductive material or a non-conductive material. Specifically, where the outer-side sealing member is made of a non-conductive material, the elastic member 29 (FIG. 3) may be made of, for example, an elastic material, such as natural rubber, butadiene rubber, or nitrile rubber.

The inner-side sealing member 28 includes an annular sealing plate 31 and an annular sealing member 32 that are attached to the inner ring 5 and the outer ring 4, respectively, so as to face each other. The sealing plate 31 is made of steel, which is conductive. The sealing plate 31 includes a cylindrical wall portion 31a fitted to the outer peripheral surface of the inner ring 5 and a radial wall portion 31b extending upward from an inboard-side end portion of the cylindrical wall portion 31a such that the sealing plate has a cross section in an L shape.

The annular sealing member 32 includes a core metal 33 made of steel, which is conductive, and a conductive elastic body 34 fixed to the core metal 33. The core metal 33 includes a cylindrical portion fitted to the inner peripheral surface of the outer ring 4 and a radial wall portion extending downward from an outboard-side end portion of the cylindrical portion such that the core metal has a cross section in a reverse L shape and axially face the sealing plate 31. The elastic body 34 may be made of, for example, a conductive rubber material. The conductive rubber material may preferably have a volume resistivity value of $30 \times 10^3 \Omega \cdot cm$ or lower. The elastic body 34 is provided so as to cover the inner side of the core metal 33 and includes two side lips 34a, 34a and a radial lip 34b.

The two side lips 34a, 34a arranged next to each other at radially inner and outer positions on the core metal 33 extend obliquely toward the outer-diameter side from the radial wall portion of the core metal 33 and have tip ends that are in contact with the radial wall portion 31b of the sealing plate 31. These side lips 34a, 34a prevent entry of water or the like from the outside. The radial lip 34b for preventing grease leak extends obliquely toward the inner-diameter side from a tip end of the radial wall portion of the core metal 33 and has a tip end that is in contact with the cylindrical wall portion 31a of the sealing plate 31.

According to this configuration, the inner-side sealing member 28 that has a function as the conducting unit 26B makes it possible to prevent abnormality in the bearing function due to electrolytic corrosion. Prevention of electrolytic corrosion makes it possible to avoid abnormality in the rolling elements 6 and the raceway surfaces of the inner and outer rings 5, 4, which can contribute to life elongation of the bearing. Moreover, the inner-side sealing member 28 has both functions of sealing the open end portion, on the inboard side, of the annular space between the inner and outer rings 5, 4 and serving as the conducting unit 26B, making it possible to reduce the number of components and to reduce costs with a simplified structure.

Figure 5A:
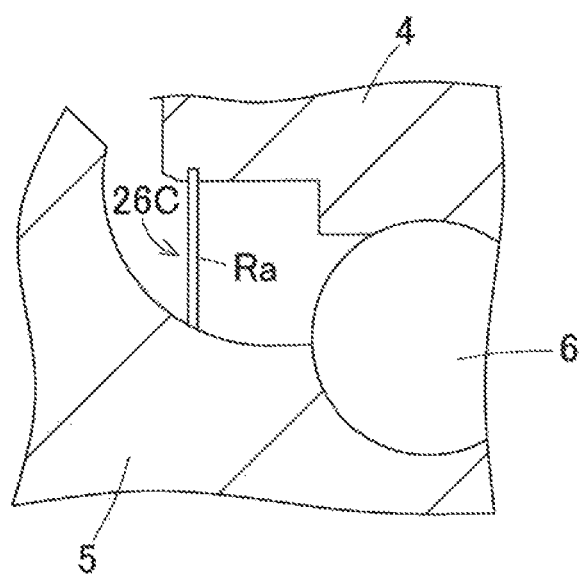
FIG. 5A is an enlarged sectional view of a conducting unit of a wheel bearing apparatus with a generator according to a fourth embodiment of the present invention.
Figure 5B:
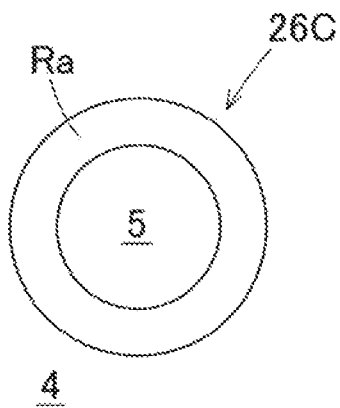
FIG. 5B is a front view of the conducting unit shown in FIG. 5A.

As shown in FIG. 5A and FIG. 5B, as a conducting unit 26C of a wheel bearing apparatus with a generator according to a fourth embodiment, a conductive ring Ra may be used instead of the outer-side sealing member made of a conductive material as described above. The inner peripheral surface of the shoulder part of the outer ring 4 is formed with an annular groove to which an outer peripheral edge portion of the conductive ring Ra is fitted and fixed, and an inner peripheral edge portion of the conductive ring Ra abuts the outer peripheral surface of the inner ring 5. The conductive ring Ra may be made of, for example, a carbon-containing resin or rubber material. Use of such a resin material or a rubber material is preferable because conducting performance can be continuously ensured without damaging the surface on the opposite side to be contacted (in this example, the outer peripheral surface of the inner ring 5). The inner peripheral edge portion of the conductive ring Ra may be fixed to the outer peripheral surface of the inner ring 5, and the outer peripheral edge portion of the conductive ring may abut the inner peripheral surface of the outer ring 4. The conductive ring Ra can be used along with a non-conductive outer-side sealing member, although it is not illustrated.

Figure 5C:
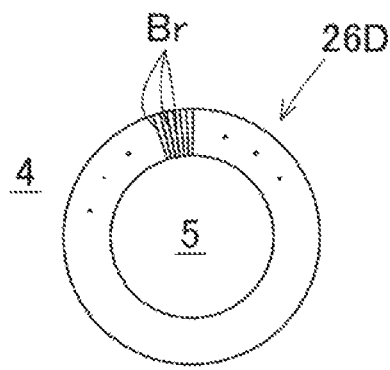
FIG. 5C is a front view of a first variant of the conducting unit shown in FIG. 5B.
Figure 5D:
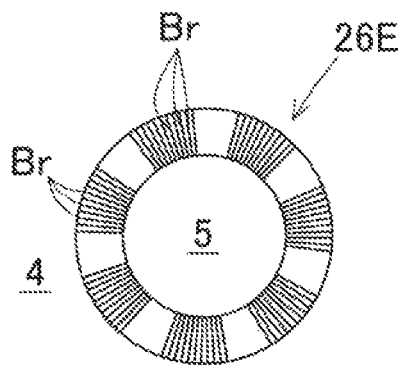
FIG. 5D is a front view of a second variant of the conducting unit shown in FIG. 5B.

As respectively shown in FIG. 5C and FIG. 5D, conducting units 26D, 26E, which are first and second variants of the conducting unit 26C (FIG. 5B) of the wheel bearing apparatus with the generator according to the fourth embodiment, may be in the form of conducting brushes Br. There may be a plurality of the conducting brushes Br across an entire circumference of an open end portion, on the outboard side, of the annular space between the inner and outer rings 5, 4 (FIG. 5C). Alternatively, they may be provided at predetermined intervals in a circumferential direction (FIG. 5D). The conducting brushes Br extend radially outward from the outer peripheral surface of the inner ring 5 in a radiating manner and have tip ends that abut the inner peripheral surface of the outer ring 4. Inversely, the conducting brushes Br may extend radially inward from the inner peripheral surface of the outer ring 4 and have tip ends that abut the outer peripheral surface of the inner ring 5.

The configurations of FIG. 5C and FIG. 5D make it possible to reduce torque in the wheel bearing and to improve fuel consumption and electric power consumption rate of the vehicle, in comparison with cases where a conductive ring, etc. is used. The configuration of FIG. 5D makes it possible to reduce the amount of the conducting brushes Br, to reduce torque as well as to reduce costs, in comparison with cases where the conducting brushes Br (FIG. 5C) are provided across an entire circumference.

As shown in FIG. 6, conducting brushes Br of a wheel bearing apparatus with a generator according to a fifth embodiment may axially extend from an end face of the outer ring 4 on the outboard side and has a tip end that abuts an end face of the hub flange 7 on the inboard side. A plurality of conducting brushes Br may be provided across an entire circumference or be provided at predetermined intervals in a circumferential direction. The conducting brushes Br may extend axially from an end face of the hub flange 7 on the inboard side and has a tip end that abuts with an end face of the outer ring 4 on the outboard side.

The configuration shown in FIG. 6 makes it possible to reduce torque in the wheel bearing and to improve fuel consumption or electric power consumption rate of the vehicle, in comparison with cases where a conductive ring, etc. is used.

Figure 7:
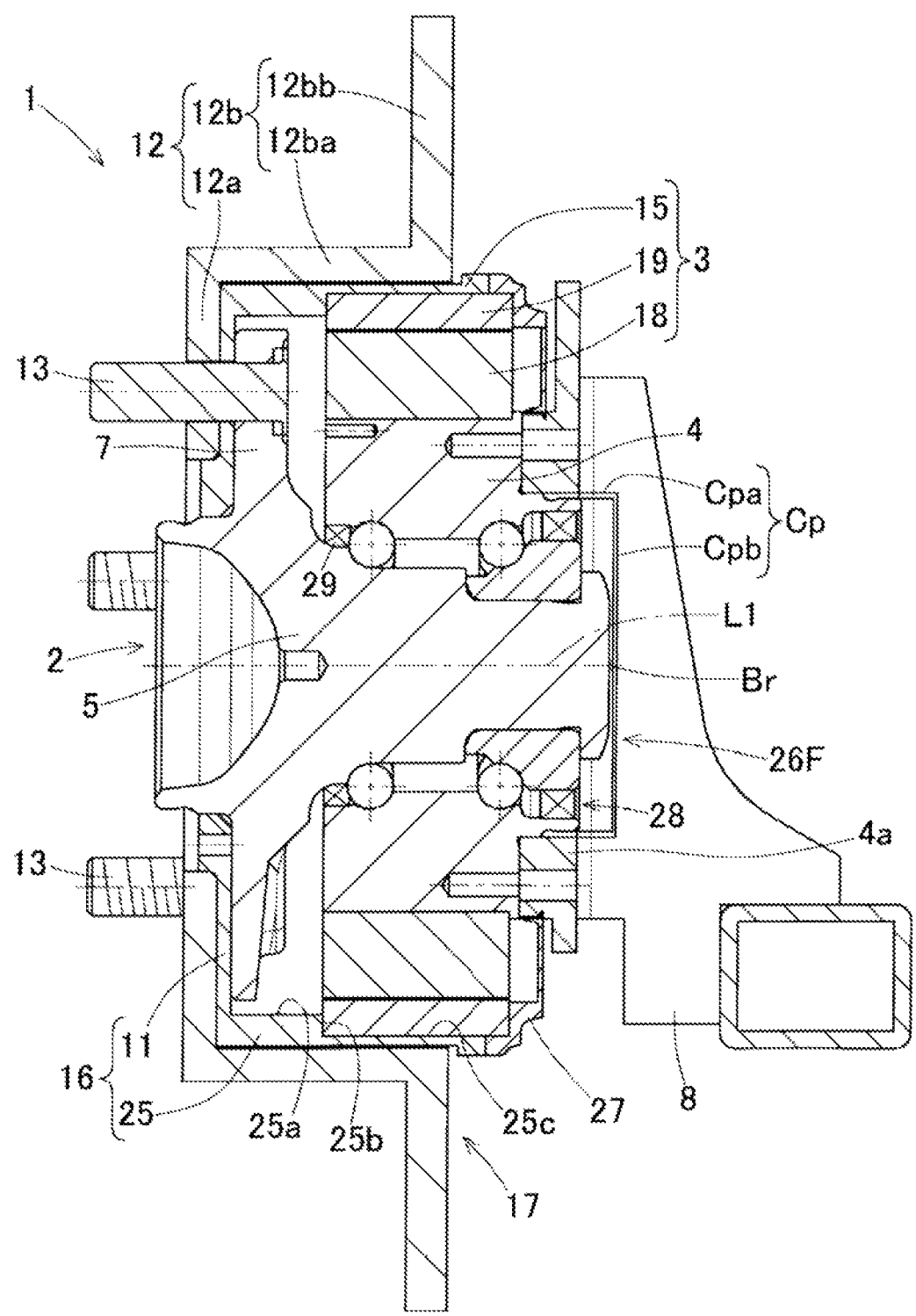
FIG. 7 is a sectional view of a wheel bearing apparatus with a generator according to a sixth embodiment of the present invention.

As shown in FIG. 7, a conducting unit 26F of a wheel bearing apparatus with a generator according to a sixth embodiment may be a conductive covering member Cp that covers the inboard-side end of the outer ring 4, and the covering member Cp may contact with the inner ring 5 at a center of a rotation axis L1. The covering member Cp prevents entry of water or foreign matter or the like from the inboard side. The covering member Cp includes a cylindrical portion Cpa fixed to the outer ring 4 and a bottom surface portion Cpb covering an inboard-side end of the cylindrical portion Cpa and is formed in a bottomed cylindrical shape having a recessed cross section. Conducting brushes Br extending axially are provided between a central portion of an inner surface of the bottom surface portion Cpb of the covering member Cp and a central portion around the rotation axis at the inboard-side end of the inner ring 5. Alternatively, the central portion of the inner surface of the bottom surface portion Cpb may be in direct contact with the central portion around the rotation axis at the inboard-side end of the inner ring 5. A plate spring member (not illustrated) that protrudes from the bottom surface portion Cpb of the covering member Cp may be provided such that the plate spring member is pressed against the central portion around the rotation axis of the inner ring 5.

The configuration with the conductive covering member Cp allows the covering member Cp to be in contact with the inner ring 5 without being influenced by a peripheral speed of the wheel bearing 2. This covering member Cp makes it possible to prevent electrolytic corrosion as well as to reduce torque in the wheel bearing 2, improving fuel consumption or electric power consumption rate of the vehicle. Where the plate spring member is provided, the plate spring member can be in stable contact with the central portion around the rotation axis of the inner ring 5.

Figure 8:
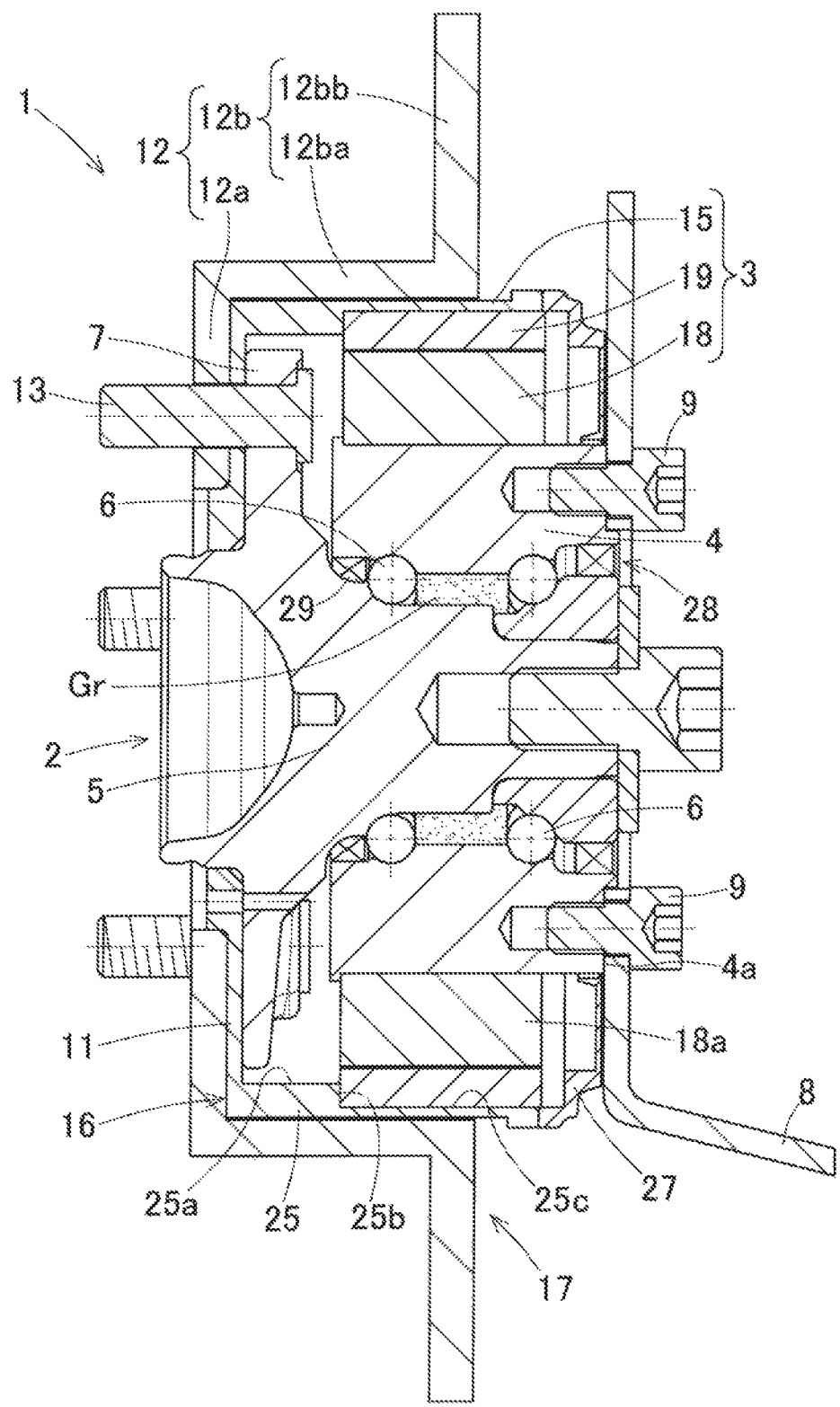
FIG. 8 is a sectional view of a wheel bearing apparatus with a generator according to a seventh embodiment of the present invention.

As shown in FIG. 8, a conducting unit of a wheel bearing apparatus with a generator according to a seventh embodiment may be conductive grease Gr that is filled in the wheel bearing. A base oil used for the conductive grease Gr is not particularly limited and may be one or more (i.e. blended) of well-known lubrication oils, including, for example, mineral oil, synthetic hydrocarbon oil, ester oil, ether oil, glycol oil, and alkylcyclopentane oil. Such a base oil preferably may have a viscosity (at 40° C.) in a range from 10 to 200 mm$^2$/s. A base oil having a lower viscosity than the above range has a large amount of evaporation, resulting in an insufficient life for use. A base oil having a higher viscosity than the above range increases torque in the wheel bearing, making the oil unsuitable for use. For these reasons, a base oil may more preferably have a viscosity in a range from 10 to 100 mm$^2$/s and even more preferably from 20 to 100 mm$^2$/s.

Although a thickener added to such a base oil is not particularly limited and may be, e.g., a metal soap, it is preferable to use carbon black as the thickener in order to sufficiently increase a conductivity.

Conductive carbon added to impart a desired conductivity to the grease may preferably have a particle size in a range from 300 Å to 800 Å and may preferably be conductive carbon having a dibutyl phthalate (DBP) oil absorption in a range from 50 to 300 ml/100 g. In order to improve a conductivity of the conductive grease, it is preferable to add a largest possible amount of conductive carbon.

Conductive carbon having a smaller particle size than a predetermined particle diameter and a higher oil absorption than a predetermined value has a high thickening property, i.e., tends to have a high thickening property when subjected to shear stress in a bearing, and tends to cause aggregated grease to hardly spread on a raceway surface, making it difficult to obtain a desired conductivity.

Because of such tendency, the conductive carbon may more preferably have a particle size in a range from 400 Å to 600 Å and a dibutyl phthalate (DBP) oil absorption in a range from 50 to 200 ml/100 g, and may preferably be added in an addition ratio in a range from 20 wt % to 40 wt %.

In order to sufficiently increase a conductivity, the conductive grease Gr may be added with metal powder and/or conductive whiskers, besides the conductive carbon. The conductive whiskers may preferably have, in particular, an aspect ratio of 10 or higher and a volume resistivity value of $1 \times 10^2 \Omega \cdot cm$ or less and may be present in an addition ratio in a range from 0.5 to 10 wt %. Where the addition ratio is lower than 0.5 wt %, such addition may not provide sufficient effect, whereas where the addition ratio is higher than 10 wt %, acoustic characteristics (silencing property) of the bearing may be deteriorated. The addition ratio may be in a range from 0.5 to 5 wt % in terms of more preferable prospect.

<Vehicle System>

Figure 9:
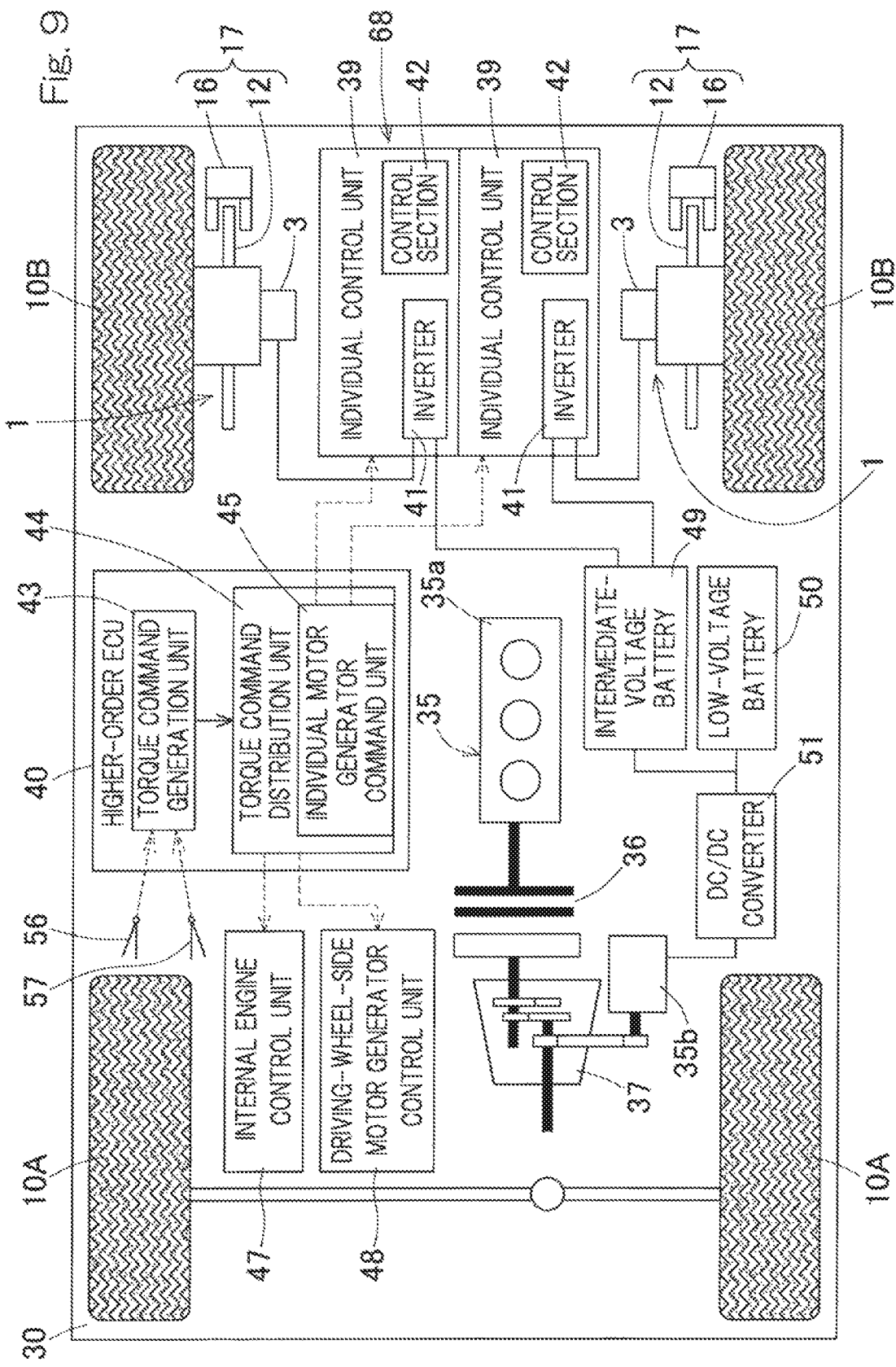
FIG. 9 is a block diagram illustrating a conceptual configuration of a vehicle system that uses the wheel bearing apparatus with the generator according to any one of the first to seventh embodiments.

FIG. 9 is a block diagram illustrating a conceptual configuration of a vehicle system that uses a plurality of wheel bearing apparatuses 1 with generators according to any one of the first to seventh embodiments.

In a vehicle 30 including driven wheels $10_B$ that are not mechanically coupled with a main driving source, each of a plurality of wheel bearing apparatuses 1 with generators is mounted to each driven wheel $10_B$. The wheel bearing 2 (FIG. 1) in each wheel bearing apparatus 1 with a generator is a bearing that supports a corresponding one of the driven wheels $10_B$.

The main driving source 35 may be an internal combustion engine, such as a gasoline engine or a diesel engine, or a motor generator (electric motor), or a hybrid-type driving source having these types of engines in combination. The "motor generator" refers to an electric motor capable of generating power by causing rotation. In the illustrated example, the vehicle 30 is a hybrid vehicle (hereinafter, may also referred to as "HEV") of a front-wheel drive type having driving wheels $10_A$, $10_A$ as front wheels, driven wheels $10_B$, $10_B$ as rear wheels, and the main driving source 35 including an internal combustion engine 35a and a motor generator 35b on the driving-wheel side.

Specifically, the vehicle is of a mild-hybrid type in which the motor generator 35b on the driving-wheel side is driven at an intermediate voltage, e.g., 48 V. Hybrids are generally categorized into strong hybrids and mild hybrids: mild hybrids refer to hybrid vehicles that have an internal combustion engine as a main driving source and use a motor mainly to assist travelling when starting and accelerating, which are distinguished from strong hybrids in that the mild hybrids can normally travel only for a while, but not for a long time in an EV (electric vehicle) mode. The internal combustion engine 35a in FIG. 9 is connected to a drive shaft of the driving wheels $10_A$, $10_A$ via a clutch 36 and a speed reducer or reduction gear 37, and the speed reduction gear 37 is connected with the motor generator 35b on the driving wheel side.

The vehicle system includes: generators 3, 3 that are motor generators for travel assistance that rotatably drive the driven wheel $10_B$, $10_B$; individual control units 39, 39 that controls the corresponding generators 3, 3; and an individual motor generator command unit 45 that is provided in a higher-order ECU 40 and outputs a command for causing the individual control units 39, 39 to perform control of driving and regeneration. The generators 3, 3 are connected to a power storage unit. The power storage unit may be, e.g., a battery (rechargeable battery) or a capacitor. Although the power storage unit can be any type and be positioned anywhere in the vehicle 30, it is an intermediate-voltage battery 49 of the low-voltage battery 50 and intermediate-voltage battery 49 mounted in the vehicle 30 in this embodiment.

The generators 3 for the driven wheels are direct drive motors that do not use a transmission. The generators 3 serve as electric motors when electricity is supplied and also serves as generators that converts kinetic energy of the vehicle 30 into electricity.

Since the motor rotor 19 (FIG. 1) is attached to the inner ring 5 (FIG. 1) that is a hub ring, the generators 3 is configured to rotatably drive the inner ring 5 (FIG. 1) when electric current is applied to the generators 3 and to generate regenerative electrical power when induced voltage is loaded at the time of power regeneration.

<Control System of Vehicle 30>

The higher-order ECU 40 is a unit for performing integrated control of the vehicle 30 and includes a torque command generation unit 43. The torque command generation unit 43 generates a torque command according to respective signals of operation amounts inputted from an acceleration operation unit 56 (e.g., an accelerator pedal) and a brake operation unit 57 (e.g., a brake pedal). Since the vehicle 30 includes the internal combustion engine 35a as the main driving source 35 and the motor generator 35b on the driving wheel side and further includes the two generators 3, 3 that drives the two respective driven wheels $10_B$, $10_B$, the higher-order ECU 40 is provided with a torque command distribution unit 44 that distributes torque commands to the respective driving sources 35a, 35b, 3, 3 in accordance with a predetermined rule.

A torque command to the internal combustion engine 35a is transmitted to an internal combustion engine control unit 47 to be used for, e.g., valve opening control by the internal combustion engine control unit 47. A torque command to the motor generator 35b on the driving wheel side is transmitted to a driving-wheel-side motor generator control unit 48 to be executed. A torque command to the generators 3, 3 on the driven wheel side is transmitted to the individual control units 39, 39. A part of the torque command distribution unit 44 for outputting commands to the individual control units 39, 39 is referred to as an individual motor generator command unit 45. The individual motor generator command unit 45 also has a function of providing the individual control units 39 with torque commands indicating braking forces to be shared by the generators 3 through regenerative braking according to a signal of an operation amount from the brake operation unit 57. The individual motor generator command unit 45 and the individual control units 39, 39 form a control unit 68 for controlling the generators 3, 3.

Each individual control unit 39 is an inverter device and includes: an inverter 41 that converts direct current power of the intermediate-voltage battery 49 into three-phase alternate current voltage; and a control section 42 that controls an output of the inverter 41 according to e.g. the torque commands through e.g. PWM control. The inverter 41 includes: a bridge circuit (not illustrated) having a semiconductor switching element, etc.; and a charging circuit (not illustrated) that charges the intermediate-voltage battery 49 with regenerative electrical power of an auxiliary power device 3. Although each of the individual control units 39 is individually provided to the two generators 3, 3, the two individual control units 39, 39 may be accommodated in one enclosure and share one control section 42.

Figure 10:
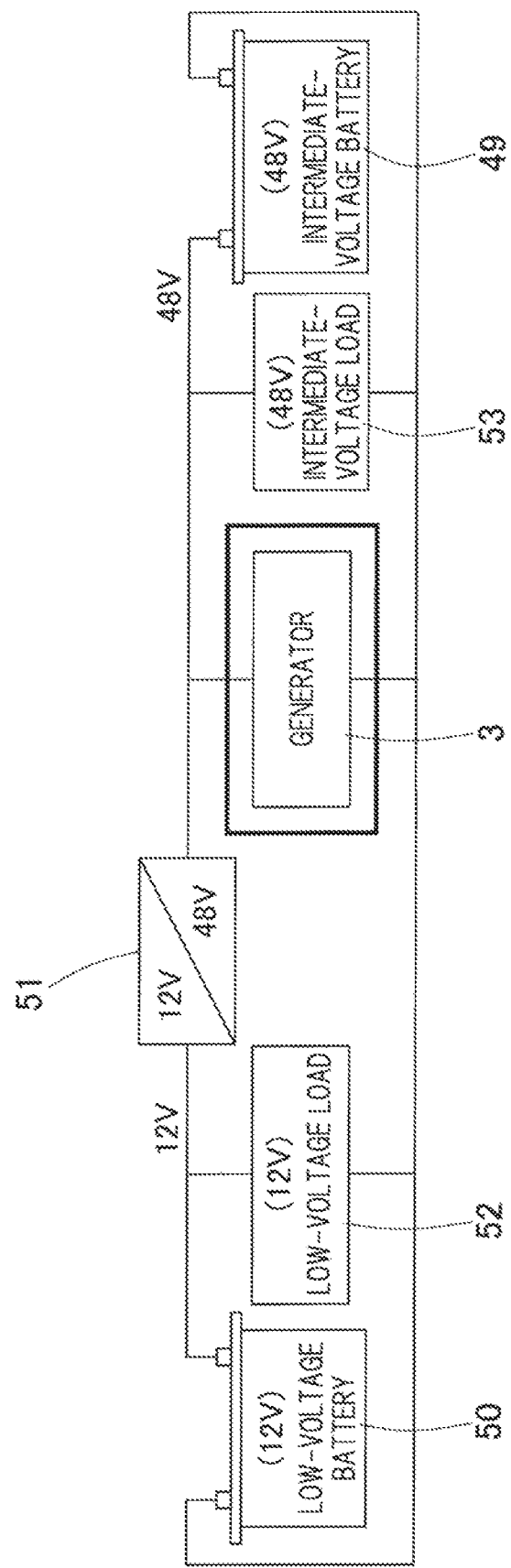
FIG. 10 is a power system diagram as an example of a vehicle including the vehicle system shown in FIG. 9.

FIG. 10 is a power system diagram as an example of a vehicle equipped with the vehicle system shown in FIG. 9. In the illustrated example, the low-voltage battery 50 and the intermediate-voltage battery 49 are provided as batteries, and the batteries 49, 50 are connected via a DC/DC converter 51. One generator 3 is shown as a representative of the two generators 3, 3. Although the motor generator 35b (FIG. 9) on the driving wheel side shown in FIG. 9 is not illustrated in FIG. 10, it is connected to the intermediate-voltage system in parallel with the generator 3 on the driven wheel side. The low-voltage system is connected with a low-voltage load 52, and the intermediate-voltage system is connected with an intermediate-voltage load 53. There are a plurality of the low-voltage loads 52 and a plurality of the intermediate-voltage loads 53, and one for each load is shown as a representative in FIG. 10.

The low-voltage battery 50 is a battery used for various automobiles in general as a power source for e.g. a control system and may be, for example, 12V or 24V. The low-voltage load 52 may include a starter motor of the internal combustion engine 35a, lights, and key components, such as the higher-order ECU 40 and other ECU (not illustrated). The low-voltage battery 50 may be called as an auxiliary battery for electric accessories, and the intermediate-voltage battery 49 may be called as an auxiliary battery for an electric system.

The intermediate-voltage battery 49 has a voltage higher than that of the low-voltage battery 50 but lower than that of a high-voltage battery (100V or higher, for example, about 200 to 400V) used for e.g. strong hybrid vehicles, the voltage having a negligible influence to a human body when an electric shock occurs during operation. For example, it is preferable to use a 48V battery that has been employed for mild hybrids in recent years. The intermediate-voltage battery 49, such as a 48V battery, can be relatively easily installed in a vehicle having a conventional internal combustion engine, and such a vehicle can reduce fuel consumption through power assistance and/or regeneration by electric power, as a mild hybrid.

The intermediate-voltage loads 53 of the 48V system are the-accessory components, including the power assist motor that is the generator 3 on the driving wheel side, an electric pump, an electric power steering, a supercharger, and an air compressor. Since the loads from the accessories are set up as the 48V system, the system can reduce the risk of an electric shock to a passenger or a maintenance operator, though the system can provide a lower output of power assistance than that of a high-voltage system (such as, for a strong hybrid vehicle with 100V or higher). The system also allows an insulation coating of a wire to be thin, making it possible to reduce the weight and/or volume of the wire. In addition, the system can input/output a larger amount of electricity with a smaller amount of current than that of a 12V system, making it possible to reduce the volume of the electric motor or the generator. Thus, the system contributes to the effect of reducing fuel consumption of the vehicle.

This vehicle system is suitable for accessory components of such a mild-hybrid vehicle and is applied as a power-assist and power-regenerative component. It should be noted that, for example, although conventionally a CMG, a GMG, or a belt-drive starter motor (these are not illustrated) has been sometimes employed in a mild-hybrid vehicle, all of these are affected by efficiency of a transmitting device and a speed reduction gear because they perform power assistance or regeneration for an internal combustion engine or a power device.

In contrast, since the vehicle system in the present embodiment is mounted to the driven wheel $10_B$, the vehicle system is separated from the main driving source such as the internal combustion engine 35a and the electric motor (not illustrated) and can directly use kinetic energy of the vehicle 1 under power regeneration. Where a CMG, a GMG, or a belt-drive starter motor is mounted, for example, any of these has to be taken into consideration in a designing phase to be incorporated to the vehicle 30. Thus it is difficult to be retrofitted, whereas the generator 3 of this vehicle system, which can be fitted within the driven wheel $10_B$, can be attached even to a finished vehicle in the same number of steps as that of component replacement, making it possible to set up a 48V system even to a finished vehicle having an internal combustion engine 35a only. A vehicle having the vehicle system of this embodiment may be provided with another auxiliary driving motor generator 35b, as in the example shown in FIG. 9. In such a case, an amount of power assistance or an amount of regenerative electrical power to the vehicle 30 can be increased, contributing to the further reduction in fuel consumption.

FIG. 11 shows an example in which a wheel bearing apparatus 1 with a generator according to any one of the first to seventh embodiments is applied to each of the driving wheel $10_A$, $10_A$ as the front wheels and the driven wheel $10_B$, $10_B$ as the rear wheels. The driving wheel $10_A$, $10_A$ are driven by the main driving source 35 in the form of an internal combustion engine, via a clutch 36 and a speed reduction gear 37. In this front wheel drive vehicle, the wheel bearing apparatus 1 with a generator is provided so as to support and auxiliary drive of each of the driving wheels $10_A$ and the driven wheels $10_B$. In such a way, the wheel bearing apparatus 1 with a generator may be applied not only to the driven wheels $10_B$, $10_B$, but also to the driving wheels $10_A$, $10_A$.

The vehicle system shown in FIG. 9 has a function of generating power, and it may be a system that does not cause rotation drive with supplied power. In such a case, a braking force can be generated by storing regenerative electrical power generated by the generators 3, 3 in the intermediate-voltage battery 49. Appropriate use of such a system in combination with the mechanical brake operation unit 57 or alternative thereto makes it possible to improve braking performance. Thus, when limited to the function of generating power, each individual control unit 39 may be in the form of an AC/DC converter device (not illustrated), instead of an inverter device. The AC/DC converter device has a function of converting three-phase alternative current voltage into direct current voltage to charge the intermediate-voltage battery 49 with the regenerative electrical power of the generator 3. It can be controlled more easily than an inverter, making it possible to have a compact configuration.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

1 . . . Wheel bearing apparatus with a generator
2 . . . Wheel bearing

3 . . . Generator
4 . . . Outer ring (fixed wheel)
5 . . . Inner ring (rotating wheel)
6 . . . Rolling element
7 . . . Hub flange
18 . . . Stator
19 . . . Motor rotor
26, 26A-26F . . . Conducting unit

What is claimed is:

1. A wheel bearing apparatus, comprising:
a wheel bearing including a fixed wheel and a rotating wheel having a hub flange, the rotating wheel being rotatably supported by the fixed wheel via rolling elements and attached with a vehicle wheel and a brake rotor at the hub flange;
a generator including a stator attached to the fixed wheel and a motor rotor attached to the rotating wheel, the generator being an outer-rotor oriented generator, wherein the stator is located on an outer periphery of the wheel bearing, and the motor rotor is located radially outside of the stator; and
an electrical conductor configured to conduct a current between the fixed wheel and the rotating wheel, wherein the electrical conductor includes a conductive covering member that includes:
   a first portion fixed to the fixed wheel and extending in an inboard-side direction beyond an inboard-side end of the fixed wheel, and
   a second portion extending from the first portion, covering the inboard-side end of the fixed wheel, and having conducting brushes formed to one of:
      extend axially between a central portion of an inner surface of a bottom surface portion of the conductive covering member and a central portion around a rotation axis at an inboard-side end of the rotating wheel, and
      in direct contact with the inboard-side end of the rotating wheel at a center of a rotation axis of the rotating wheel,
wherein an inboard-side end of the rotating wheel is formed with no insertion hole.

* * * * *